United States Patent [19]

Roe et al.

[11] Patent Number: 5,152,966
[45] Date of Patent: * Oct. 6, 1992

[54] APPARATUS FOR PRODUCING A CONTROLLED ATMOSPHERE

[75] Inventors: Elman Roe; William R. Ash; Terry Campbell; Steve Forney, all of Yakima, Wash.

[73] Assignee: Nicap, Inc., Yakima, Wash.

[*] Notice: The portion of the term of this patent subsequent to Apr. 4, 2006 has been disclaimed.

[21] Appl. No.: 370,406

[22] Filed: Jun. 22, 1989

[51] Int. Cl.$^5$ .............................................. F25J 3/00
[52] U.S. Cl. ..................................... 422/111; 422/40; 422/112; 426/418; 99/475; 62/141; 55/387; 55/484
[58] Field of Search ...................... 422/9, 10, 40, 108, 422/110, 111, 112, 120; 62/17, 78, 94, 141; 426/418, 419; 99/475; 55/387, 484

[56] References Cited

U.S. PATENT DOCUMENTS

| | | | |
|---|---|---|---|
| 3,205,049 | 9/1965 | Lannert et al. | 422/40 X |
| 3,313,630 | 4/1967 | Harvey, Jr. | 422/211 X |
| 3,313,631 | 4/1967 | Jensen | 422/40 R |
| 3,445,194 | 5/1969 | Thomas et al. | 426/418 X |
| 3,453,085 | 7/1969 | Lannert et al. | 422/40 X |
| 3,958,028 | 5/1976 | Burg | 426/418 |
| 4,228,197 | 10/1980 | Means | 422/40 X |
| 4,710,206 | 12/1987 | Allen et al. | 426/419 X |
| 4,745,796 | 5/1988 | Abdalrahman | 73/56 |
| 4,754,611 | 7/1988 | Hosaka et al. | 426/419 |
| 4,806,132 | 2/1989 | Cambell | 55/16 |
| 4,817,391 | 4/1989 | Roe et al. | 62/17 |

FOREIGN PATENT DOCUMENTS 28492  8/1930  Australia .

OTHER PUBLICATIONS

Prism Controlled Atmosphere Systems, Permea, Inc. a Monsanto Co. 1987.
Monsanto Company Proposal for Forney Fruit, Jun. 6, 1985 unpublished.

Primary Examiner—James C. Housel
Assistant Examiner—Jeffrey R. Snay
Attorney, Agent, or Firm—Robert M. Bellomy

[57] ABSTRACT

An apparatus for producing a controlled atmosphere in an area by providing for the removal of oxygen, carbon dioxide, water droplets and ethylene from a gas stream. The apparatus includes two compressors to increase the pressure of the gases present which are then separated by diffusion across at least two membranes.

13 Claims, 2 Drawing Sheets

APPARATUS FOR PRODUCING A CONTROLLED ATMOSPHERE

FIELD OF INVENTION

This invention pertains to the production of controlled atmospheres, particularly controlled atmospheres for the preservation of materials of biological materials, and with still greater particularity to the production of carbon dioxide and oxygen depleted atmospheres for the long term refrigerated storage of food materials.

BACKGROUND OF THE INVENTION

It has been known for some time that produce stored under refrigeration maintains its freshness for a longer period of time than produce stored at ambient temperatures. For example, the refrigerated shipments of produce from California to the East Coast has been done since the 1920's. It is not as widely known, but is familiar to those in the business, that controlling the composition of the atmosphere in the area where storage is being undertaken extends the lifetime of food products.

An apparatus for producing a controlled atmosphere is described in U.S. Pat. No. 4,817,391 issued Apr. 4, 1989 to applicant.

Controlled atmosphere storage is usable for a wide variety of food products. For the purpose of this application, food products are defined to include all materials of plant or animal origin intended for the consumption of man or animals. By way of non-limiting limiting example, such products include fruit, vegetables, produce, meats, dairy products, grains, and seafood products.

Such storage can be accomplished either at a warehouse or during the transport of the food products. A desireable apparatus would be usable in warehouses, ships, train cars, trucks, and containers for shipment in any of the above modes of transportation.

The apparatus should be able to be conformed to produce any desired combination of atmospheric gases. The selection should be adjustable to alter the atmospheric composition for a particular product. For example, the concentration of ethylene is critical for storage of fruits, but relatively unimportant for storage of meats.

The method and apparatus illustrated in applicants earlier patent described above accomplishes the above goals. Capacity of the above apparatus is limited, however, by the size of the area in which the controlled atmosphere is sought. Attempts to increase capacity by merely scaling up the apparatus have not been totally successful. In addition, the use of the above apparatus puts a lower limit on the amount of oxygen that can be removed from the system. Accordingly, there is a need for a high capacity apparatus that can produce any desired atmosphere.

SUMMARY OF THE INVENTION

The invention provides a method and apparatus for producing a controlled atmosphere that may readily be scaled up or down to service a given sized area. The invention provides a method and apparatus for completely controlling the composition of gases in this area and can provide extremely low levels of oxygen, ethylene and carbon dioxide in the area. The system accomplishes these ends without the introduction of contaminating gases or liquids into the area.

The apparatus includes an apparatus similar to that described in applicant's prior patent. A second system including a membrane separation unit and compressor is connected to the first system through a unique valuing/control system. An apparatus is provided to control the temperature of the gases produced by both systems. The first system is provided with inputs from either the area in which the controlled atmosphere is sought or the outside atmosphere. Which input is selected is determined by the control system. The second system processes outside atmosphere only. The operation of both systems is controlled in time by the control system.

The use of two systems provides a greater benefit than just a doubling of the size of a single system. By using two systems, the first system operates for a greater proportion of the time on air from the area in which the controlled atmosphere is desired. In turn the first system is not required to cycle. The second system reduces the oxygen level by displacement by nitrogen Due to the combination of systems, both systems may be operated at lower pressures than a single system which increases the amount of gas that each can process The result is a more efficient system.

DETAILED DESCRIPTION OF THE FIGURES

Figure 1:
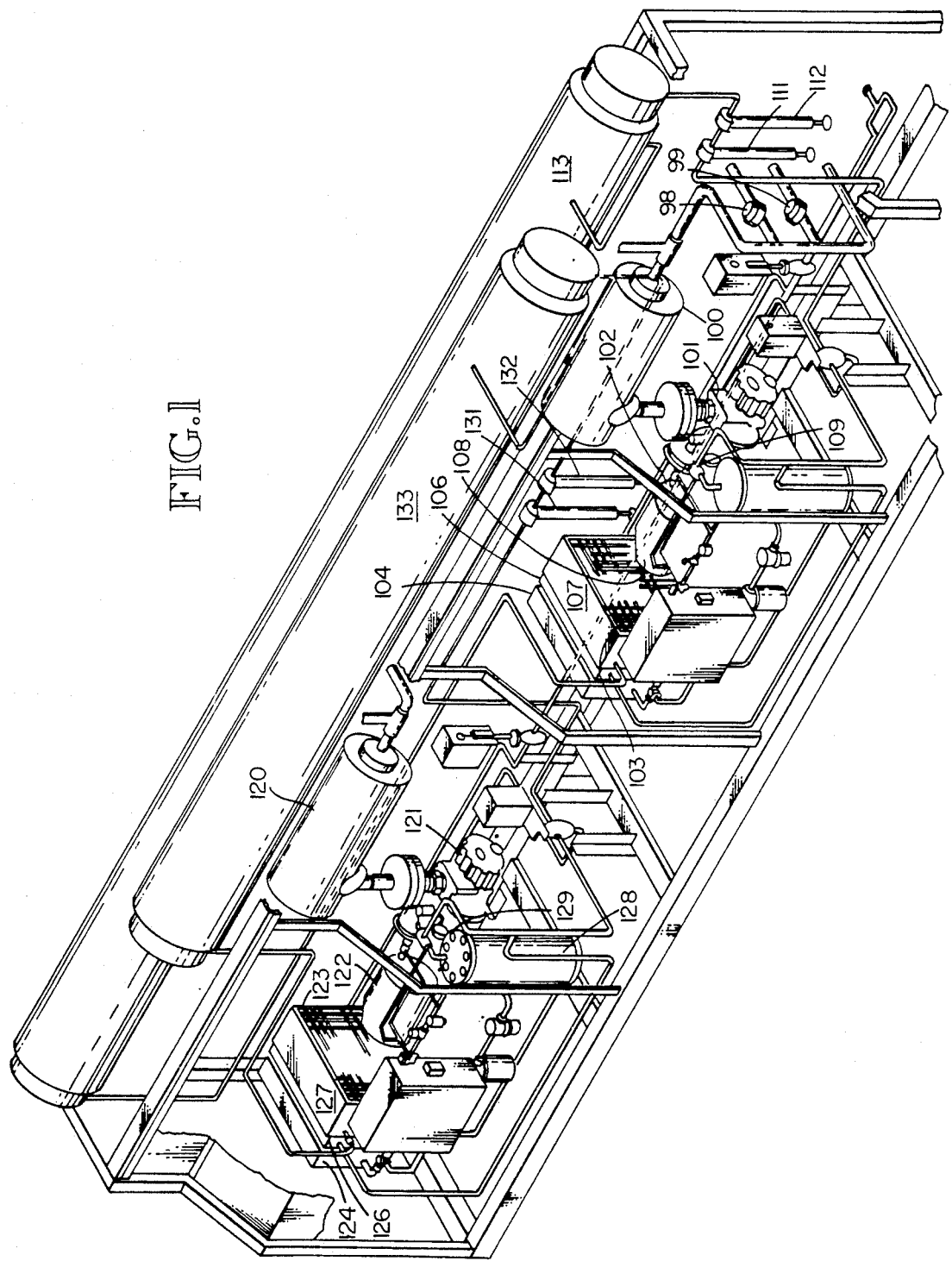
FIG. 1 is a perspective view of the apparatus of the invention

FIG. 1 is a perspective view of the apparatus of the invention. The area in which the controlled atmosphere is sought is not shown in this drawing. That area commonly would be a warehouse equipped with refrigeration equipment and constructed in such a manner so as to be air tight. The apparatus may also be scaled up or down for use in transportation In the case of use in transportation, the area in which the controlled atmosphere is desired could be a truck trailer or container or even a large transport ship.

An air compressor 101 is at the heart of the apparatus. A suction air filter 100 cleans all gases entering compressor 101. two control valves 98 and 99 control the source of the gasses entering compressor 101. Compressor 101 is powered by a motor 102. Motor 102 is commonly an electric motor but an internal combustion engine could be substituted especially in mobile applications. Motor 102 has a two ended shaft. An additional variation would be to use a second motor for the fan used in conjunction with a remote heat exchanger. Compressor 101 is connected to one end of this shaft. A fan 103 is connected to the other end of the shaft.

Fan 103 is so arranged as to blow air through three heat exchangers 104, 106, and 107. The first heat exchanger 104 cools the oil used to lubricate air compressor 101. The second heat exchanger 106 cools the air that leaves compressor 101. Since gasses are heated by compression, heat exchanger 106 is needed to prevent damage to the other components of the system The final heat exchanger 107 cools the gas just before exit into the area in which the controlled atmosphere is desired. The purpose of exchanger 107 is to reduce the load on any refrigeration apparatus used to cool the area.

Gasses leaving compressor 101 enter an oil filter 108 which removes oil introduced by compressor 101 from the gas stream. A three way control valve 109 controls the amount of gas that passes through heat exchanger 106. Two filters 111 and 112 remove water and oil from the gas stream. The gas then enters the gas separator 113. Gas separator 113 is a 10 foot membrane separator in a pressure jacket in this embodiment. Different sized separator units could be used in different capacity systems. The desired gas which is nearly pure nitrogen exits separator 113 and is cooled by heat exchanger 107 before entering the area where the controlled atmosphere is desired.

A second system is used in conjunction with that already described. An air compressor 121 is also at the heart of the second system. A suction air filter 120 cleans all gases entering compressor 121. Compressor 121 only receives gasses through filter 120 from the outside atmosphere. Compressor 121 is powered by a motor 122. Motor, 122 is commonly an electric motor but an internal combustion engine could be substituted especially in mobile applications. Compressor 121 and motor 122 are commonly smaller than compressor 101 and motor 102. Motor 122 has a two ended shaft. An additional variation would be to use a second motor for the fan used in conjunction with a remote heat exchanger. Compressor 121 is connected to one end of this shaft. A fan 123 is connected to the other end of the shaft.

Fan 123 is so arranged as to blow air through three heat exchangers 124, 126, and 127. The first heat exchanger 124 cools the oil used to lubricate air compressor 121. The second heat exchanger 124 cools the air that leaves compressor 121. Since gasses are heated by compression, heat exchanger 126 is needed to prevent damage to the other components of the system. The final heat exchanger 127 cools the gas just before exit into the area in which the controlled atmosphere is desired. The purpose of exchanger 127 is to reduce the load on any refrigeration apparatus used to cool the area.

Gasses leaving compressor 121 enter an oil filter 128 which removes oil introduced by compressor 121 from the gas stream. A three way control valve 129 controls the amount of gas that passes through heat exchanger 126. Two filters 131 and 132 remove water and oil from the gas stream. The gas then enters the gas separator 133. Gas separator 133 is a 6.6 foot membrane separator in a pressure jacket in this embodiment. Of course a larger or smaller unit could be used without detracting from the general invention. The desired gas which is nearly pure nitrogen exits separator 133 and is cooled by heat exchanger 127 before entering the area where the controlled atmosphere is desired.

Figure 2:
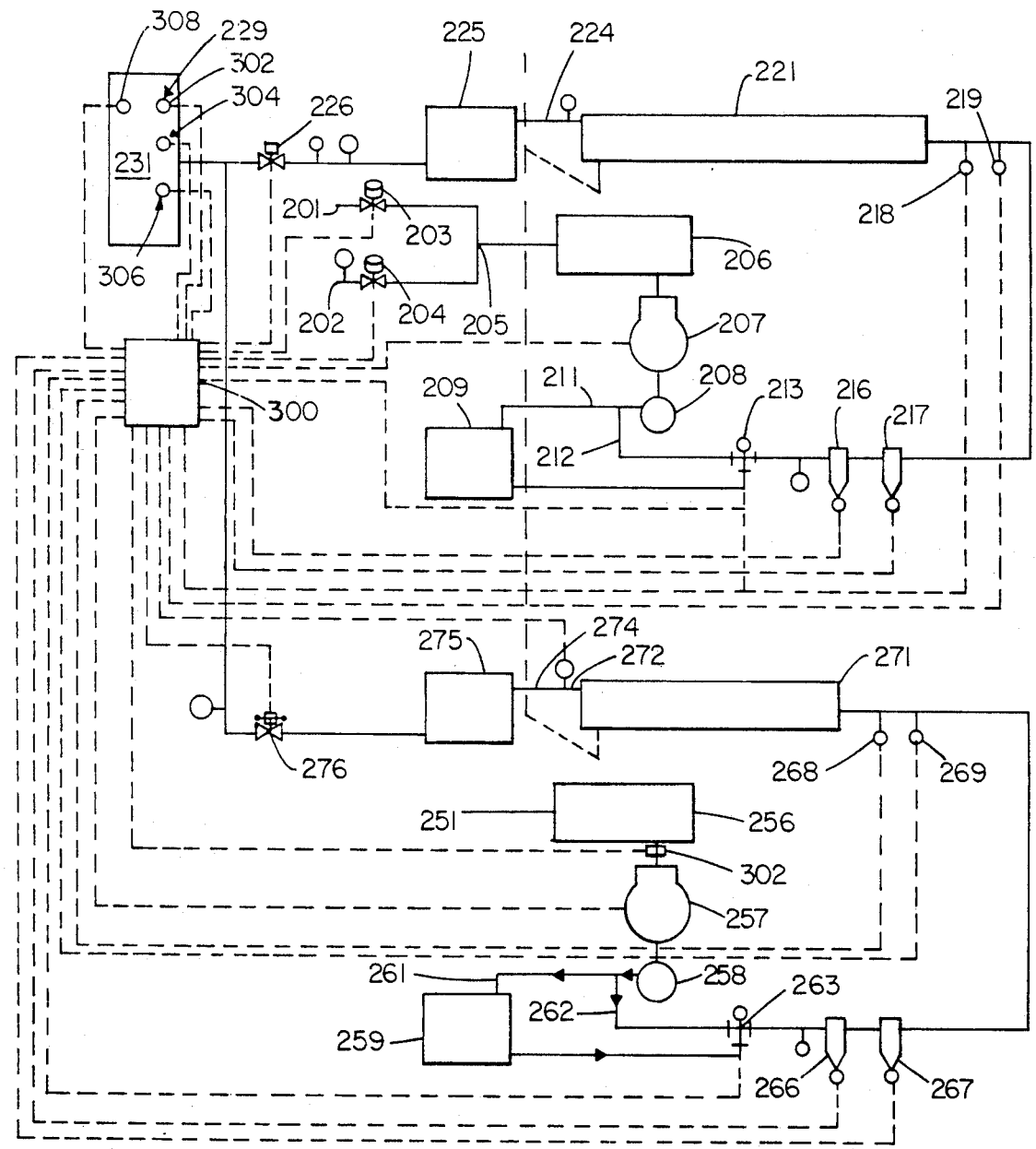
FIG. 2 is a schematic diagram of the apparatus of the invention.

FIG. 2 is a schematic diagram of the apparatus of the invention. The first system of the apparatus has two inlets 201,202. The first inlet 201 is connected to the outside atmosphere. This first inlet is controlled by an electrically activated valve 203. The second inlet 202 is connected to the area in which a controlled atmosphere is sought. Inlet 202 is also controlled by an electrically activated valve 204. The two inlets join at a Tee intersection 205.

The selected stream now enters a suction air filter 206. Filter 206 removes dust particles that may be suspended in the air from either outside air or air from the area in which the controlled atmosphere is sought. The outlet of filter 206 is connected to the inlet of the first system compressor 207. In this embodiment of the invention a Sullair Screw Air Compressor rated at 40 horsepower 60 Hz. 3 phase 1770 rpm has been found to be satisfactory. Compressor 207 raise the pressure of gas in the system to operating levels.

A Coalescing Oil-Filter 208 is connected to the output of compressor 207. Filter 208 removes oil introduced into compressor 207 for the purpose of cooling and lubricating compressor 207.

The gas in the system is heated by compression to about 165 degrees F. A portion of the gas is diverted to a heat exchanger 209 via line 211. Heat exchanger 209 is preferably mounted behind an oil cooling heat exchanger (not shown) the motor that drives compressor 207 also drives a fan which blows air through all heat exchangers. A bypass 212 is provided around heat exchanger 209. Bypass 212 and the outlet of heat exchanger 209 are both connected to a three-way temperature control valve 213. Valve 203 is controlled in such a manner to insure that the gas stream has a temperature of between 120-130 degrees F. at a temperature sensor 218. Temperatures below 110 degrees F. reduce the efficiency of membrane 221. A temperature over 130 may destroy the membrane used in this embodiment. Substitution of a different membrane will alter these operating temperatures. Temperature sensor 218 may be a 100 ohm platinum bulb sensor set in the line. A suitable controller is connected between sensor 218 and valve 213. A Honeywell UDC-3000 Temperature Controller has been found acceptable in this embodiment.

Two Coalescing Filters with Floats 216, 217 are in the line between valve 213 and sensor 218. Filters 216 and 217 remove any moisture or oil that may be in the line. Such contaminants could damage membrane 221, as the filters remove moisture and oil the contaminants fall down into a float chamber. As the float fills a ball raises a pin from its seat and discharges accumulated water and oil. A pressure sensor 219 is next passed by the gas stream.

After passing sensor 219 the gas stream enters membrane 221. Membrane 221 includes a large number of semi-permeable hollow fibers in a pressure shell. Different gasses diffuse through the fibers at different rates. Use of membrane 221 allows separation of gases without lignification or use of chemical separation. Such a membrane is manufactured by Montesano and sold under the trademark "PERMEA". Similar seperators may be substituted without detracting from the invention as described, but alteration of parameters will be necessitated by the requirements of a particular membrane selected. The fast diffusing gases include oxygen, carbon dioxide, and ethylene. These gases exit membrane 221 via outlet 222 which is connected to a moisture separator for removing water and are removed from the area. The slow diffusing gas which is primarily nitrogen exits via outlet 224. Some heat is also removed from the air stream due to the expansion of the permeated gases when they leave membrane 221 and enter the outside atmosphere.

The exiting gas next enters another heat exchanger 225. Heat exchanger 225 further cools the gases in order to reduce any load on refrigeration systems in the area in which the controlled atmosphere is sought. Heat exchanger 225 is an air to Air exchanger and is preferably mounted in series with heat exchanger 209.

The gas stream next enters a Back Pressure Regulator Valve 226. The purpose of valve 226 is to control the pressure across membrane 221. The higher the pressure is the more pure is the nitrogen produced. Air passing membrane thus is a high quality stream of nitrogen with a controlled amount of oxygen. Since oxygen and other gases are removed from the area in which the controlled atmosphere is sought the pressure in this area will also be reduced unless the gases are replaced. The system replaces these gases with additional nitrogen extracted from the outside atmosphere.

This control is accomplished by the operation of valves 203 and 204. At no time are both valves 203 and 204 energized at the same time. Pressure in the area 231 in which the controlled atmosphere is sought is measured by a highly sensitive instrument 229 which measures pressure in inches of water. When the pressure is positive valve 204 is energized which allows gases to be removed from area 231 to be processed and returned to area 231. This removal in turn cause a negative pressure in area 231. Upon sensing a negative pressure sensor 229 closes valve 204 and opens valve 203 allowing processing of outside atmosphere. With a single system this causes a on-off switching.

The second system has a single inlet 251 from the outside atmosphere. Gasses from inlet 251 enter a suction air filter 256. Filter 256 removes dust particles that may be suspended in the air from the outside air. The outlet of filter 256 is connected to the inlet of the second system compressor 257. In this embodiment of the invention a Sullair Screw Air Compressor rated at 25 horsepower 60 Hz. 3 phase 1770 rpm has been found to be satisfactory. Compressor 257 raises the pressure of gas in the system to operating levels.

A Coalescing Oil-Filter 258 is connected to the output of compressor 257. Filter 258 removes oil introduced into compressor 257 for the purpose of cooling and lubricating compressor 257.

The gas in the system is heated by compression to about 165 degrees F. A portion of the gas is diverted to a heat exchanger 259 via line 261. Heat exchanger 259 is preferably mounted behind an oil cooling heat exchanger (not shown) the motor that drives compressor 256 also drives a fan which blows air through all heat exchangers. A bypass 262 is provided around heat exchanger 259. Bypass 262 and the outlet of heat exchanger 259 are both connected to a three-way temperature control valve 263. Valve 263 is controlled in such a manner to insure that the gas stream has a temperature of between 120–130 degrees F. at a temperature sensor 268. Temperatures under 110 degrees F. reduce the efficiency of membrane 271. Temperatures above 130 degrees f. may destroy the membrane 271 used in this unit. Temperature sensor 268 may be a 100 ohm patinum bulb sensor set in the line. A suitable control is connected between sensor 268 and valve 263. A Honeywell UDC-3000 Temperature Controller has been found acceptable in this embodiment.

Two Coalescing Filters with Floats 266, 267 are in the line between valve 263 and sensor 268. Filters 266 and 267 remove any moisture or oil that may be in the line. Such contaminants could damage membrane 271. As filters 266 and 277 remove moisture and oil the contaminants fall down into a float chamber. As the float chamber fills a ball raises a pin from its seat and discharges accumulated water and oil. A pressure sensor 269 is next passed by the gas stream.

After passing sensor 269, the gas stream enters membrane 271. Membrane 271 includes a large number of semipermeable hollow fibers in a pressure shell. Different gasses diffuse through the fibers at different rates. Use of membrane 271 allows separation of gases without lignification or use of chemical separation. Such a membrane is manufactured by Montesano and sold under the trademark "PERMEA". Again, other similar units could be substituted with adjustment of operating parameters. The fast diffusing gases include oxygen, carbon dioxide, and ethylene. These gases exit membrane 271 via outlet 272 which is connected to a moisture separator for removing water and are removed from the area. The slow diffusing gas which is primarily nitrogen exits via outlet 274.

The exiting gas next enters another heat exchanger 275. Heat exchanger 275 further cools the gases in order to reduce any load on refrigeration systems in the area in which the controlled atmosphere is sought. Heat exchanger 275 is an air to air exchanger and is preferably mounted in series with heat exchanger 259.

The gas stream next enters a Back Pressure Regulator Valve 276. The purpose of valve 276 is to control the pressure across membrane 271. The higher the pressure is the more pure is the nitrogen produced. Air passing membrane thus is a high quality stream of nitrogen with a controlled amount of oxygen. Since oxygen and other gases are removed from the area in which the controlled atmosphere is sought, the pressure in this area will also be reduced unless the gases are replaced. The second system replaces these gases with additional nitrogen extracted from the outside atmosphere.

The second system provides a source of nitrogen which is extracted directly form the outside atmosphere. This allows the first system to operate on gases from area 231 constantly and not cycle.

In operation both systems are activated. The first system removes the undesired gases from area 231. The second system reduces the level of these gases by displacement with nitrogen.

We claim:

1. An apparatus for producing a controlled atmosphere in a preselected area, comprising:
   inlet means for accepting exhaust gases from said area where said controlled atmosphere is desired;
   a first compressor having an entrance and an exit, with said entrance being connected to an outside atmosphere and to said inlet means;
   a first gas separation means connected to said first compressor exit for removing gases selected from the group consisting of carbon dioxide, oxygen, ethylene, and water vapor from gases received from said first compressor;
   first outlet means connected to said first gas separation means for releasing gases into said area where said controlled atmosphere is desired;
   a first valve connected between said first compressor entrance and said inlet means;
   a second valve connected to said first compressor entrance and in flow communication with said outside atmosphere;
   a sensing means arranged so as to sense a pressure in said area where said controlled atmosphere is desired;
   an activation means connected to said first valve and said second valve, said activation means for activating said first valve and said second valve when said sensing means senses a pressure outside a set of preselected pressure limits;
   a second compressor having an entrance and an exit, said second compressor entrance in flow communication with said outside atmosphere; and
   a second gas separation means having an entrance and an exit, said second gas separation means exit in flow communication with said area where said controlled atmosphere is desired.

2. An apparatus for producing a controlled atmosphere in a preselected area, as claimed in claim 1, further comprising:
   hydration means connected between said first gas separation means and said first outlet means for increasing a relative humidity in said area where said controlled atmosphere is desired, and;
   means for connecting said hydration means to said first gas separation means.

3. An apparatus for producing a controlled atmosphere in a preselected area, as claimed in claim 1, wherein said first gas separation means is a series of semi-permeate tubes in a pressure jacket.

4. An apparatus for producing a controlled atmosphere in a preselected area, as claimed in claim 1, further comprising an air filter in flow communication with said second valve.

5. An apparatus for producing a controlled atmosphere in a preselected area, as claimed in claim 1, wherein said second compressor and said second gas separation means are connected to said activation means so that when said area pressure is outside of said preselected pressure limits, said second compressor and said second gas separation means are activated to provide additional gases extracted from said outside atmosphere.

6. An apparatus for producing a controlled atmosphere in a preselected area, as claimed in claim 1, wherein said second gas separation means is a series of semi-permeate tubes in a pressure jacket.

7. An apparatus for producing a controlled atmosphere in a preselected area, as claimed in claim 1, further comprising an air filter in flow communication with said second compressor entrance.

8. An apparatus for producing a controlled atmosphere in a preselected area, as claimed in claim 1, further comprising:
   a first bypass valve connected around said first gas separation means, arranged so as to control an amount of oxygen in said area where said controlled atmosphere is desired; and
   a means for adjusting said first bypass valve.

9. An apparatus for producing a controlled atmosphere in a preselected area, as claimed in claim 8, further comprising:
   a second outlet means from said first gas separation means for allowing waste gases to exit said first gas separation means; and
   a moisture separator connected to said second outlet means for removing water.

10. An apparatus for producing a controlled atmosphere in a preselected area, as claimed in claim 8, further comprising:
    a first oil separator connected between said first compressor and said first gas separation means so as to remove oil from said gases issuing from said first compressor, and;
    a gas filter connected between said first oil separator and said first gas separation means for removing particulate matter from the gas issuing from said first compressor.

11. An apparatus for producing a controlled atmosphere in a preselected area, as claimed in claim 10, further comprising:
    a second oil separator connected between said second compressor and said second gas separation means so as to remove oil from said gases issuing from said second compressor; and
    a second gas filter connected between said second oil separator and said second gas separation means for removing particulate matter from the gas issuing from said second compressor.

12. An apparatus for producing a controlled atmosphere in a preselected area, as claimed in claim 8, further comprising:
    a second bypass valve connected around said second gas separation means so as to control said amount of oxygen in said area where said controlled atmosphere is desired; and
    a means for adjusting said second bypass valve.

13. An apparatus for producing a controlled atmosphere in a preselected area, as claimed in claim 12, further comprising:
    a second outlet means from said second gas separation means for allowing waste gases to exit said second gas separation means; and
    a moisture separator connected to said second outlet means for removing water.

* * * * *